Figures 1, 2:
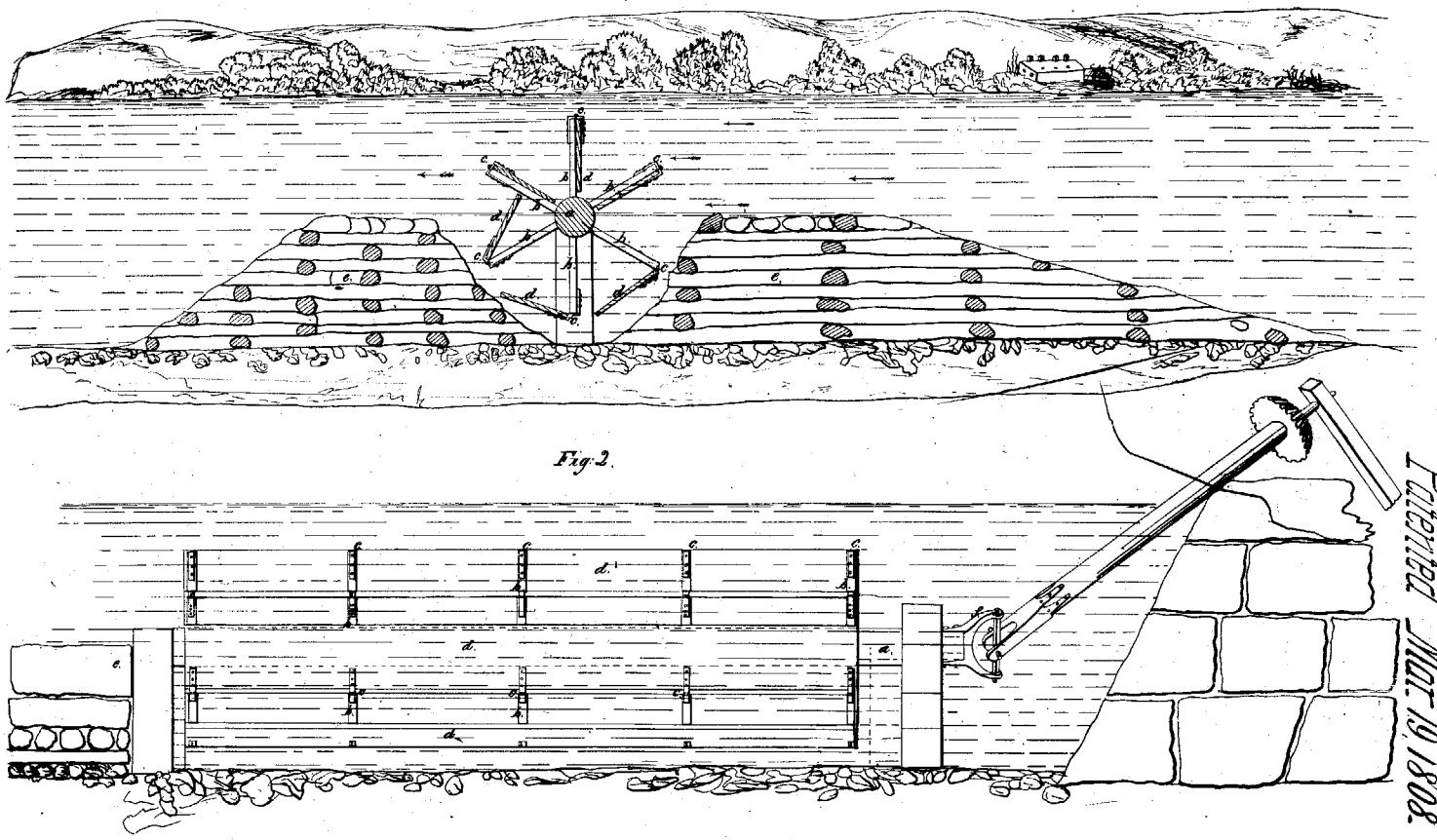

836X

J. Johnson

Water Wheel,

Patented Mar. 19, 1808.

836X March ~~19~~ 21 · 1808

John Johnson
Letters Patent Issued March. 19. 1808.

The Schedule referred to in these Letters Patent and making part of the same containing a descrip-
tion in the words of the said John Johnson himself of a Wheel to run under water.

This Wheel requires no other or greater motion of the column of water which impinges against
the floats than the common & most running current of a river. The wheel is calculated to run
at the bottom of the Stream under ice drift &c. It may be applied to all kinds of mills & ma-
chinery which are usually worked by the means of water. The wheel may be four or five feet in
diameter and from ten to forty feet and upwards in length. however the length depends on the
power required. The wheel revolves vertically. The water impinges against the floats from the
shaft to the uppermost part of the wheel for the water runs on the uppermost part over the
wheel. The shaft may be any given length (according to the power required and the velocity of
the water) thirty feet will be sufficient in length for any common mill works and from ten to
twelve inches in diameter. In a wheel of thirty feet in length there ought to be five sets of arms
and three in each set. The number of sets of arms depends upon the length of the wheel. The
arms ought to be made as — small as is consistent with ~~the~~ strength in order that they
may expose as small as possible a surface to be acted upon by the water in the revolu-
tion of the wheel. As soon as the water comes to impinge against the floats which are
fixed to the extremity of the arms by a hinge they turn edgeways and move in the water
in that position until the current again begins to act — on them. There must be a
dam raised to the height of half the diameter of the wheel or else the wheel sunk half
its diameter even with the bottom of the stream and extend the [illegible] wing of the dam as
far as necessary and the near wing joins it to the bank. Thus the lower part of the wheel will re-
volve in eddy water. The floats are as long as the shaft and in a wheel of five feet diame-
ter they will be two feet broad. There is one shaft (or more) which extends out on
the bank & to this height the works are to be fixed & connected with the wheel shaft by an
universal joint. The floats of a thirty feet wheel are thirty feet long and two feet broad in a
wheel of five feet diameter, which presents a surface for the water to impinge against of
sixty square feet. This wheel may be applied to the raising of water for the supply of Towns
Farms &c situated on the banks of Rivers Witnesses { John Bedollet
Nath^l Ewing John Johnson.

Exd
[illegible]